United States Patent Office 3,271,329
Patented Sept. 6, 1966

3,271,329
METHOD FOR PRODUCING POLYMERS DERIVED FROM PHOSPHITES AND GLYCOLS
Harry W. Coover, Jr., and Richard L. McConnell, Kingsport, Tenn., assignors to Eastman Kodak Company, Rochester, N.Y., a corporation of New Jersey
No Drawing. Filed Sept. 19, 1958, Ser. No. 761,934
5 Claims. (Cl. 260—2)

This invention relates to new organophosphorus polymers and to their method of preparation. In a specific aspect this invention relates to new organophosphorus polymers prepared from dialkyl or diaryl hydrogen phosphites and certain glycols or dihydroxy aromatic compounds. In another specific aspect this invention relates to fibers produced from the new organophosphorus polymers.

In accordance with this invention we have found that new organophosphorus polymers can be obtained by the transesterification of dialkyl or diaryl hydrogen phosphites with certain glycols or certain dihydroxy aromatic compounds. By way of example the organophosphorus polymers of this invention can be formed by the transesterification reaction of a dialkyl or diaryl hydrogen phosphite with trans-1,4-cyclohexanedimethanol. The reaction can be illustrated by the following equation:

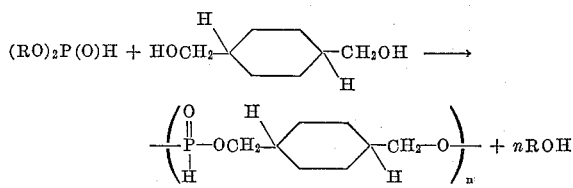

wherein R is either an alkyl or an aryl radical. Similarly by way of example the reactions within the scope of our invention can be illustrated by the reaction of diphenyl hydrogen phosphite and 4,4'-isopropylidenediphenol. The transesterification reaction can be shown by the following equation:

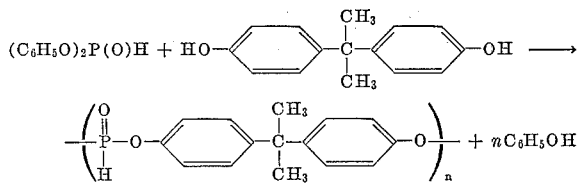

In practicing our invention one of the monomers can be a glycol wherein the hydroxy groups are separated by more than three carbon atoms. Usually the number of carbon atoms in the chain separating the hydroxy groups contains from 4 to 8 carbon atoms. Typical glycols that can be used in practicing our invention are 1,4-butanediol, 1,5-pentanediol, 1,6-hexanediol, 1,7-heptanediol, 1,8-octanediol, cis-1,4-cyclohexanedimethanol, etc. It is important that the hydroxy radicals be separated by more than 3 carbon atoms since glycols wherein the hydroxy groups are separated by 3 or less carbon atoms generally lead to the formation of cyclic organophosphorus compounds and not to organophosphorus polymers. One exception to this rule is 2,2,4,4,-tetramethyl-1,3-cyclobutanediol which gives polymers and not cyclic products.

In another aspect of our invention a dihydroxy aromatic compound can be employed as one of the monomers. In the aromatic compounds it is desirable to have the hydroxy groups in para or meta positions in the compound. We have found that when the hydroxy groups are in ortho positions the products are usually cyclic organophosphorus compounds and not organophosphorus polymers. Typical examples of the dihydroxy aromatic compounds that can be used in practicing our invention are hydroquinone, resourcinol, 4,4'-isobutylidenediphenol, 4,4'-ethylidenediphenol, 4,4'-methylenediphenol, 4,4'-isopropylidene bis(2,6-dichlorophenol), 4,4'-isopropylidene bis(2,6-dibromophenol), bis(2-hydroxy-3-tertiary butyl-5-methylbenzyl)durene, bis(2-hydroxy-3,5-dimethylbenzyl) durene, p,p'-biphenol, and 4,4'-sulfonyldiphenol.

The hydrogen phosphites that are employed in practicing our invention have the formula:

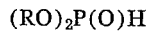

wherein R is selected from the group consisting of alkyl radicals containing from 1 to 4 carbon atoms and phenyl. When the polymerization reaction is carried out using a dihydroxy aromatic compound as one of the monomers, R in the above formula should be phenyl since dihydroxy aromatic compounds will not transesterify with a dialkyl hydrogen phosphite to form organophosphorus polymers under the present reaction conditions.

The polymerization reaction is generally carried out at a temperature within the range of 0–350° C. and reaction periods within the range of 1–16 hours have been found to be quite satisfactory. The reaction can be carried out without the use of a catalyst but in some instances it is desirable to employ a catalyst particularly at the lower reaction temperatures. Catalysts are also desirable to increase the molecular weight of the polymer. Suitable catalysts for the reaction include the alkali metals, such as sodium and potassium, sodium amide, sodium di-lower alkyl phosphites, sodium diphenylphosphite, sodium or potassium alkoxides, sodium titanium alkoxides, titanium alkoxide, for example, titanium ethoxide and titanium butoxide, aluminum trichloride, sodium aluminate and dibutyl tin oxide. In general, the polymerization reaction is carried out without the use of a solvent but if desired, the reaction can be conducted in the presence of an inert solvent or diluent.

The polymers of this invention have been found to have excellent color and to be useful for various purposes. The molecular weight of the polymer depends upon the reaction conditions and catalysts employed and in practicing this invention it is possible to produce polymers of either high or low molecular weight. The high molecular weight polymers are white, high softening solids than can be spun into fibers or formed into articles by the usual forming procedures such as extruding or molding. The high molecular weight polymers of this invention have been found to be highly flame resistant. The lower molecular weight polymers are transparent colorless viscous oils.

The following examples are illustrative of the method by which our polymers can be formed and of the types of polymers that can be produced in practicing our invention.

*Example 1.—Polymer derived from diphenyl hydrogen phosphite and 4,4'-isopropylidenediphenol*

Diphenyl hydrogen phosphite (0.1 mole), 4,4'-isopropylidenediphenol (0.1 mole), and sodium aluminate (0.1 g.) were mixed is a round bottom flask. The reaction flask was lowered into a molten metal bath which had been preheated to 130° C. The temperature of the reaction mixture was gradually raised to 190° C. over a 1 hour period. Then vacuum was gradually applied to the system and phenol was slowly distilled from the reaction mixture at a head temperature of 95–100° C. at 50 mm. pressure. The reaction mixture was maintained in the 195–200° C. range for 1 hour and then the pressure was lowered to 2.5 mm.

The pressure was maintained at 2.5 mm. for an hour while the metal bath temperature was gradually increased to a maximum of 242° C. At this time the reaction mixture was so viscous that stirring was difficult and no more phenol was being evolved. The polymer was allowed to cool under vacuum. This polymer was a colorless, hard material which did not burn even when held directly in a flame. Fibers were spun from this polymer which had excellent physical properties.

This reaction was repeated using dibutyl tin oxide and sodium titanium butoxide as the catalysts to obtain high molecular weight polymer which had properties similar to the one described above. When the reaction was repeated without a catalyst, the polymer had a molecular weight which was lower than that obtained with a catalyst.

*Example 2.—Polymer derived from diethyl hydrogen phosphite and trans-1,4-cyclohexanedimethanol*

Diethyl hydrogen phosphite (0.5 mole), trans-1,4-cyclohexanedimethanol (0.5 mole), and sodium (0.1 g.) were mixed and heated to 120° C. with stirring. At this point, ethanol was liberated and started distilling at a head temperature of 77° C. The temperature of the reaction mixture was gradually increased to 160° C. over a 5-hour period. By this time 40 ml. of ethanol had been collected ($n_D^{20}$ of distillate 1.3613). The reaction mixture was placed under reduced pressure to complete the removal of the ethanol and the reaction temperature reached a maximum of 185° C. The polymer was allowed to cool under reduced pressure. It is a transparent, water white material which pours only with difficulty at 25° C. The polymer dissolves slowly in dimethyl formamide, acetone, ethanol, and benzene.

*Example 3.—Polymer derived from diphenyl hydrogen phosphite and trans-1,4-cyclohexanedimethanol*

A polymer was prepared from diphenyl hydrogen phosphite (0.1 mole), trans-1,4-cyclohexanedimethanol (0.1 mole) and sodium aluminate (0.05 g.) according to the procedure described in Example 1. This polymer was a high softening material which was spun into extremely flame-resistant fibers.

*Example 4.—Polymer derived from diphenyl hydrogen phosphite and hydroquinone*

Diphenyl hydrogen phosphite (0.1 mole), hydroquinone (0.1 mole), and dibutyl tin oxide (0.05 g.) were reacted according to the procedure described in Example 1 to give a polymer which could be melt spun into fibers.

*Example 5.—Polymer derived from dibutyl hydrogen phosphite and 1,5-pentanediol*

Dibutyl hydrogen phosphite (0.2 mole), 1,5-pentanediol (0.2 mole), and 6 drops of concentrated sodium butoxide in butanol were reacted according to the procedure of Example 2 to give an extremely viscous, transparent, polymeric material.

*Example 6.—Polymer derived from diethyl hydrogen phosphite and 2,5 (or 6)-norcamphanedimethanol*

Diethyl hydrogen phosphite (0.1 mole) 2,5-(or 6) norcamphanedimethanol (0.1 mole), and sodium aluminate (0.1 g.) were reacted according to the procedure of Example 1 to give a high molecular weight polymer.

*Example 7.—Polymer derived from diethyl hydrogen phosphite and 2,2,4,4-tetramethyl-1,3-cyclobutanediol*

Diethyl hydrogen phosphite (0.2 mole), 2,2,4,4-tetramethyl-1,3-cyclobutanediol (0.21 mole) and sodium aluminate (0.1 gram) were reacted according to the procedure of Example 2. Long fibers were pulled from the hot melt of this polymer.

*Example 8.—Polymer derived from diethyl hydrogen phosphite and 30/70 mixture of cis and trans-1,4-cyclohexanedimethanol*

Diethyl hydrogen phosphite (0.2 mole), 30/70 mixture of cis and trans-1,4-cyclohexanedimethanol (0.2 mole) and a solution of titanium isopropoxide in butyl alcohol (containing 4.8% titanium) (0.2 ml.) were reacted according to the procedure of Example 2. The properties of the polymer are similar to those of the product described in Example 2.

*Example 9.—Polymer derived from dimethyl hydrogen phosphite and polyethylene glycol*

A polymer was prepared from dimethyl hydrogen phosphite (0.4 mole) and a polyethylene glycol of molecular weight 600 (0.4 mole) using sodium aluminate (0.1 gram) as the catalyst according to the procedure of Example 2. The product was a white, somewhat waxy solid.

Similar results were obtained using other polyethylene glycols having molecular weights of 150, 300, 1000, 5000 and 10,000.

*Example 10.—Polymer derived from diphenyl hydrogen Phosphite and 4,4'-isopropylidene bis(2,6-dichlorophenol)*

A colorless, hard, polymeric material was obtained when diphenyl hydrogen phosphite (0.2 mole) 4,4'-isopropylidene bis (2,6-dichlorophenol) (0.2 mole), and sodium aluminate (0.1 gram) were reacted according to the procedure of Example 1.

Similar results were obtained when 4,4'-isopropylidene bis(2,6-dibromophenol), 4,4'-ethylidenediphenol, p,p'-biphenol, and 4,4'-sulfonyldiphenol were used in place of the 4,4'-isopropylidene bis(2,6-dichlorophenol).

This invention has been described in detail with particular reference to preferred embodiments thereof, but it will be understood that variations and modifications can be effected within the spirit and scope of the invention as described above and as defined in the appended claims.

We claim:

1. A method for producing high molecular weight organo-phosphorus polymers which comprises transesterifying at a temperature within the range of 0–350° C. substantially equimolar proportions of hydrogen phosphite compound and dihydroxy compound in a reaction mixture selected from the class consisting of
   (A) reaction mixtures that comprise
      (1) a hydrogen phosphite compound having the formula

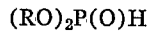

(RO)$_2$P(O)H wherein R is alkyl containing 1 to 4 carbon atoms and
      (2) a dihydroxy compound selected from the class consisting of
         (a) 1,4-cyclohexanedialkanols in which the alkanol groups contain 1–4 carbon atoms,
         (b) polyethylene glycols
         (c) 2,2,4,4 - tetramethyl-1,3-cyclobutanediol, and
         (d) 2,5- and 2,6-norcamphane dialkanols in which each alkanol group contains 1–4 carbon atoms and
   (B) reaction mixtures that comprise
      (1) diphenyl hydrogen phosphite and
      (2) a dihydroxy compound selected from the class consisting of
         (a) 1,4-cyclohexanedialkanols in which the alkanol groups contain 1–4 carbon atoms,
         (b) alkanediols containing 4–8 carbon atoms in which the hydroxy groups are separated by more than 3 carbon atoms,
         (c) polyethylene glycols,
         (d) 2,2,4,4 - tetramethyl-1,3-cyclobutanediol, and
         (e) 2,5- and 2,6-norcamphane dialkanols in which each alkanol group contains 1–4 carbon atoms
         (f) 4,4'-alkylidene diphenols in which the alkylidene group contains 1–4 carbon atoms, and
         (g) hydroquinone.

2. The method for producing high molecular weight organophosphorus polymers which comprises transesterifying substantially equimolar proportions of diphenyl hydrogen phosphite and 4,4'-isopropylidenediphenol at a temperature within the range of 0.–350° C. and a reaction time of 1–16 hours.

3. The method for producing high molecular weight organophosphorus polymers which comprises transesterifying substantially equimolar proportions of diethyl hydrogen phosphite and a mixture of cis and trans-1,4-cyclohexanedimethanol at a temperature within the range of 0–350° C. and a reaction time of 1–16 hours.

4. The method for producing high molecular weight organophosphorus polymers which comprises transesterifying substantially equimolar proportions of diphenyl hydrogen phosphite and trans-1,4-cyclohexanedimethanol at a temperature within the range of 0–350° C. and a reaction time of 1–16 hours.

5. The method for producing high molecular weight organophosphorus polymers which comprises transesterifying substantially equimolar proportions of diphenyl hydrogen phosphite and hydroquinone at a temperature within the range of 0–350° C. and a reaction time of 1–16 hours.

References Cited by the Examiner
UNITED STATES PATENTS

| | | | |
|---|---|---|---|
| 2,435,252 | 2/1948 | Fon Toy | 260—47 |
| 2,572,076 | 10/1951 | Fon Toy | 260—47 |
| 2,824,085 | 2/1958 | Cummings | 260—75 |
| 2,900,365 | 8/1959 | Haven | 260—47 |
| 2,963,451 | 12/1960 | Coates | 260—2 |

WILLIAM H. SHORT, *Primary Examiner.*

HAROLD N. BURSTEIN, MILTON STERMAN, PHILLIP MANGAN, JOSEPH R. LIBERMAN, LEON J. BERCOVITZ, *Examiners.*

LOUISE P. QUAST, *Assistant Examiner.*